INVENTORS
LEONARD FINKEL &
IRVING P. MAGASINY
BY Edward M Farrell
ATTORNEY

Nov. 19, 1963  I. P. MAGASINY ETAL  3,111,654
AUTOMATIC PULSE DEMULTIPLEX SYSTEM
Filed March 11, 1958  7 Sheets-Sheet 7

INVENTORS
LEONARD FINKEL &
IRVING P. MAGASINY
BY *Edward M. Farrell*

ATTORNEY

United States Patent Office 3,111,654
Patented Nov. 19, 1963

3,111,654
AUTOMATIC PULSE DEMULTIPLEX SYSTEM
Irving P. Magasiny, Philadelphia, Pa., and Leonard Finkel, Haddonfield, N.J., assignors, by mesne assignments to American Bosch Arma Corporation, Hempstead, N.Y., a corporation of New York
Filed Mar. 11, 1958, Ser. No. 720,611
22 Claims. (Cl. 340—183)

This invention relates to decommutation systems, and more particularly to miniature decommutation or demultiplexing systems for use in telemetering and guided missile systems.

In many types of telemetric systems associated with guided missiles, pilotless aircraft or projectiles, for example, recordations, or measurements of acceleration, temperature, pressure, current and other variable quantities are often necessary. In such systems, a plurality of pickups or transducers is often used to convert the variable quantities measured into corresponding electrical signals. The electrical signals may then be sequentially sampled to provide a time division multiplexed or, as sometimes referred, a commutated information transmission system. The sampled or commutated signals may be modulated by suitable circuit means and applied to a modulator circuit of a radio transmitter which, in turn, excites a transmitting antenna.

The transmitted signal is recovered by a receiver, which may be on the ground or at another remote point, which converts the transmitted signal into a time multiplex wavetrain. Means are then required to reconvert the multiplexed signal to a form suitable for recording and interpretation. A convenient and versatile form for the output data is a direct current output voltage from each multiplex channel which corresponds to a variable quantity at one of the pickups. The channel output voltage may be recorded by recording means for analysis at a later date or may be automatically converted into a form to give an instantaneous indication of the value of the variable quantity measured.

Present day high speed aircraft and guided missiles require the transmission of a large number of functions at increasingly higher accuracies under extreme environmental conditions. A normal one hour test flight may produce 100,000 commutated data points. Transmission of information relating to such a large number of data points generally necessitates the use of automatic data separation means, often referred to as decommutation or pulse demultiplexing systems.

Automatic pulse demultiplexing systems, which may be used in the editing or "quick-look" portions of the data system as well as for actual data processing, are required to reduce data reduction time. Demultiplexing or decommutation systems are therefore becoming increasingly more important in the telemetering and guided missile field. The demands for decreased size of a decommutation unit has increased greatly, since in many cases such units must be airborne where size and weight are often critical.

In designing decommutation circuits, various factors must be considered. For example, spurious noise signals should not affect the operation of the system. Correction for drifts in signal measuring devices or variations in the transmitting medium should also be provided. With different types of modulation systems in use, e.g., pulse width modulation and pulse amplitude modulation systems, it is desirable that a decommutation system be readily adaptable to decommutate more than one type of information signal.

It is an object of this invention to provide a decommutation system in which size and weight are reduced to a great degree over previous decommutation systems.

It is a further object of this invention to provide an improved circuit for decommutating a train of information signals.

It is still a further object of this invention to provide an improved decommutation circuit in which spurious noise signals are eliminated.

It is still a further object of this invention to provide an improved decommutation circuit in which drift correction is provided.

It is still a further object of this invention to provide an improved decommutation circuit which is adaptable for systems involving pulse width modulated, pulse amplitude modulated and other types of signals involving time intervals.

In accordance with the present invention, a commutated information signal in the form of pulses is fed through a gating circuit to an integrator circuit during a gating period. A synchronization circuit provides means for starting integration of the information signal in the integrator circuit. At the completion of the gating period, the integrator circuit is maintained for a short period of time at a voltage level which corresponds to the integrated information signal. Means are provided for applying the integrated information signal to a utilization circuit. Means are further provided for resetting the integrator circuit between the information pulses. A single integrator circuit is used in decommutating an unlimited number of commutated information signals.

Other objects and advantages of the present invention will be apparent and suggest themselves to those skilled in the art to which the present invention is related, from a reading of the following specification and claims in conjunction with the accompanying drawings, in which:

Figure 1:
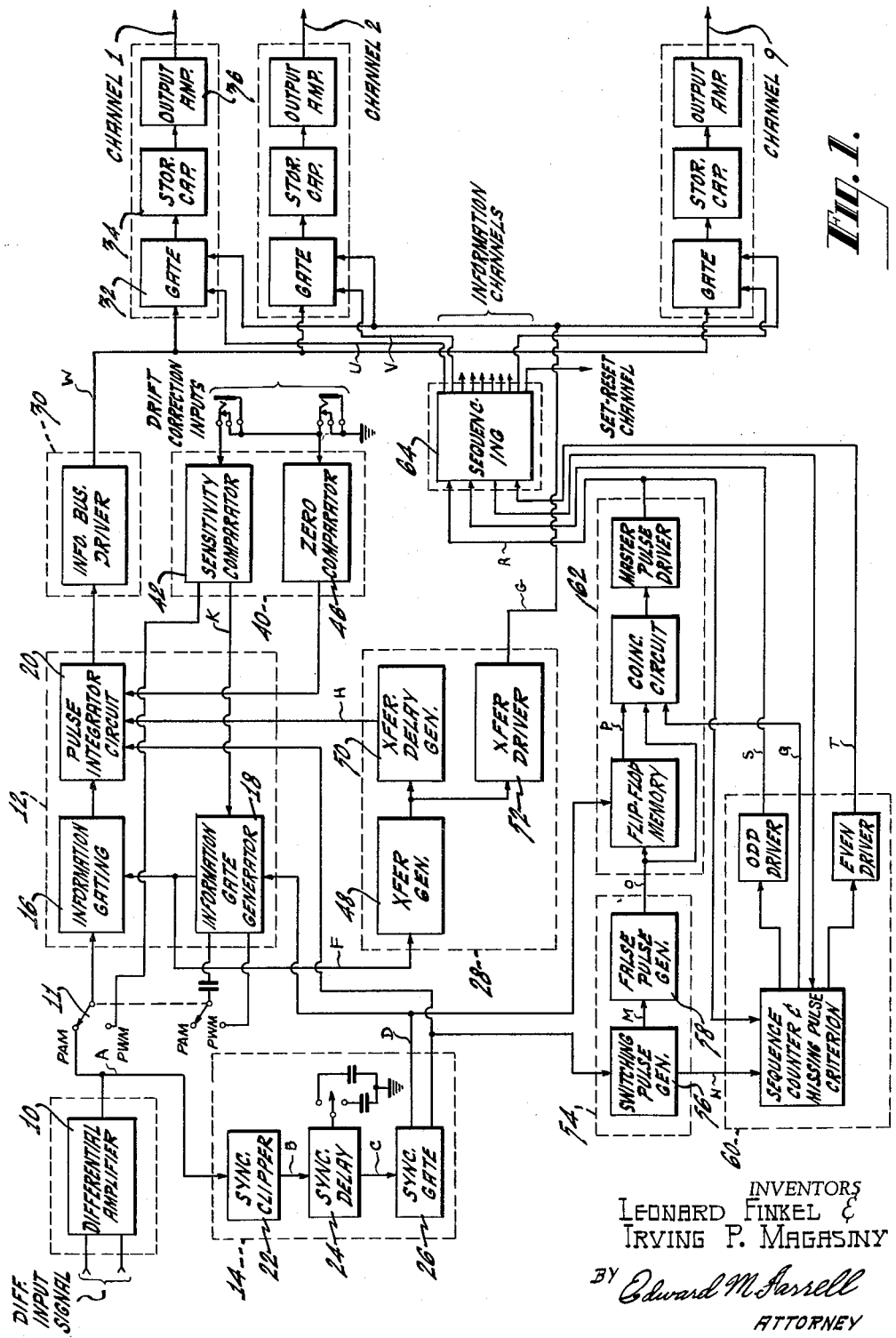
FIGURE 1 is a block diagram illustrating a complete decommutation system, in accordance with the present invention.
Figure 2:
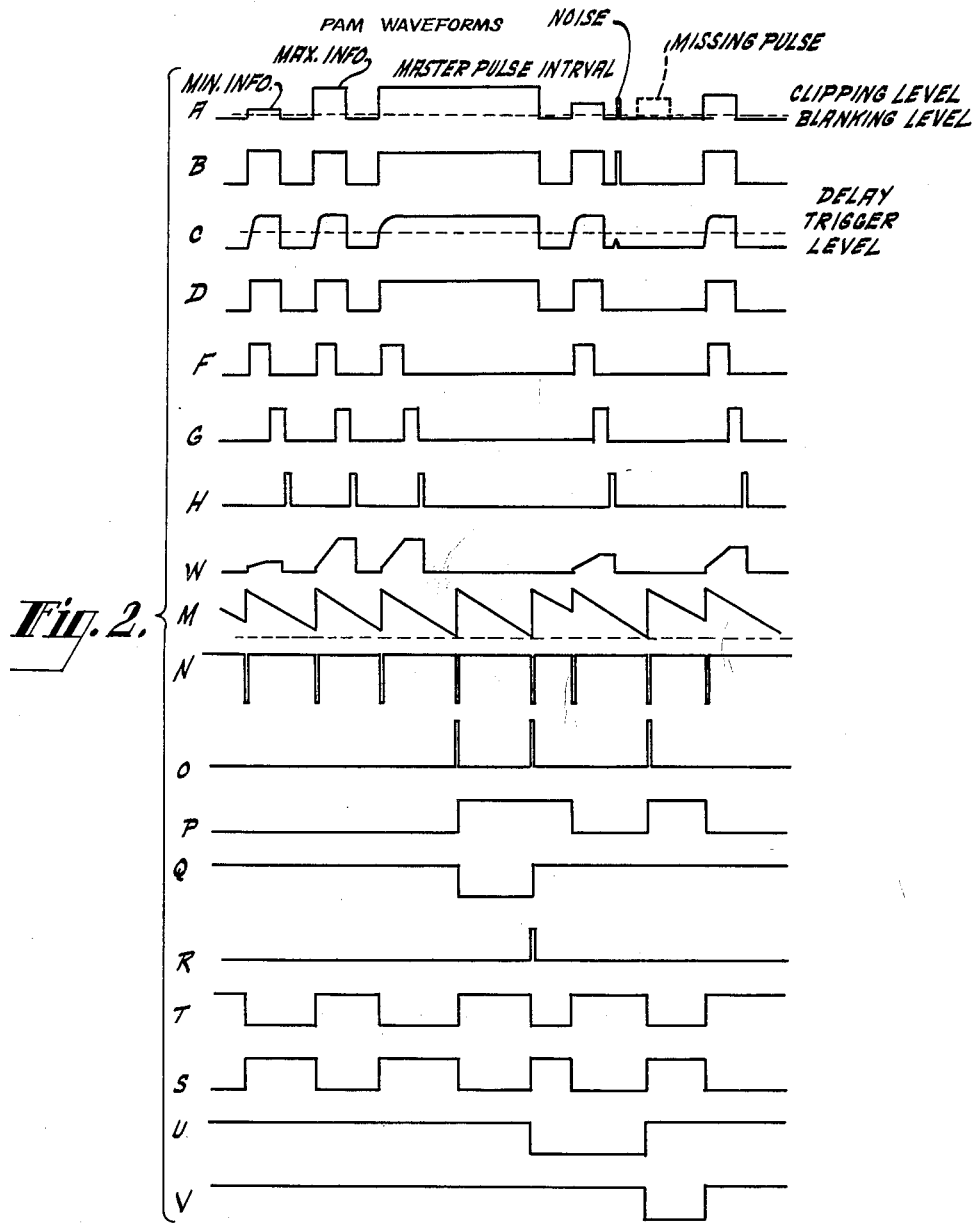
FIGURE 2 is a diagram illustrating various wave forms for the decommutation system when adapted to receive pulse amplitude modulated information signals.
Figure 3:
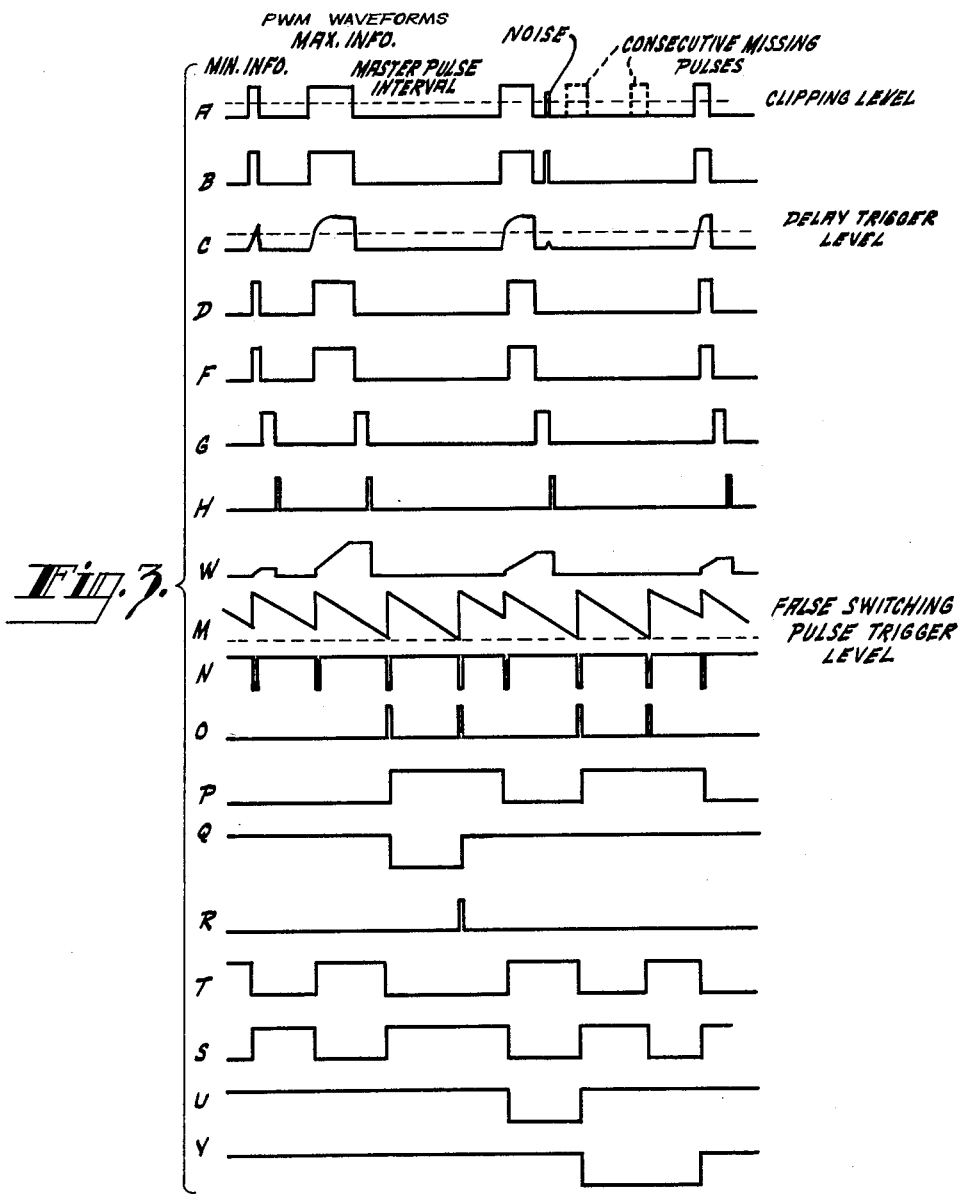
FIGURE 3 is a diagram illustrating various wave forms for the decommutation system when adapted to receive pulse width modulated information signals.

Referring particularly to FIGURES 1 and 2 of the drawing, a complete system adapted to receive PAM (pulse amplitude modulated) information signals is first described. A switch 11 is in the up position for PAM systems. When the switch 11 is in the down position, the system shown is adapted to decommutate PWM (pulse width modulated) information signals, as will be described in connection with FIGURE 3. A differential amplifier 10, capable of accepting either a single or double ended signal, may have an output signal train such as illustrated at point A. The output voltage from the differential amplifier 10 is applied to an information control unit 12 and to a synchronization separator unit 14.

The information control unit 12 includes an information gating circuit 16, an information gate generator circuit 18 and a pulse integrator circuit 20. The information control unit 12 performs the operations of gating, integration, and storage of the information data. The synchronization separator unit 14 comprises a synchronization clipper circuit 22, a synchronization delay circuit 24 and a synchronization generator circuit 26.

The output voltage at point A from the differential amplifier 10 includes a wavetrain which may have normal and missing information signals, as indicated, a master (or frame) pulse interval and spurious noise pulses. The signals at point A are applied to the synchronization clipper circuit 22. The output voltage at point B from the synchronization clipper circuit 22 is applied to the synchronization delay circuit 24 to provide an output voltage at point C, which is used to trigger the synchronization generator circuit 26 when the voltage exceeds a predetermined delay trigger level. Noise pulses do not affect the operation of the synchronization generator circuit 26 since the integrated voltage resulting from such noise pulses do not rise to the level necessary to drive the synchronization generator circuit 26.

Upon receipt of a synchronizing pulse from the synchronization generator circuit 26, denoting that a valid information pulse is at the output circuit of the differential amplifier 10, the information gate generator circuit 18 is actuated by the voltage from the synchronization generator circuit 26 at point E. The voltage at point E is not illustrated in FIGURE 2 since it is similar to the voltage at point D, except that it is of reversed polarity. Upon operation of the information gate generator circuit 18, a gating signal, illustrated at point F, is applied to the information gating circuit 16 to permit information signals from the amplifier 10 to be applied to the pulse integrator circuit 20. The gate generator 18 may be considered as an integrator control circuit, since its operation controls the operation of the pulse integrator circuit 20. Operation of the information gating circuit 16 during the gating interval causes the pulse integrator circuit 20 to start an integration operation to produce integrated signals corresponding to the amplitude of the information signals. Since the signals from the integrator control or information gate generator circuit 18 are of constant width, the integrated signals produced by the pulse integrator circuit 20 are primarily functions of the amplitudes of the received information signals.

The integrator control or gate generator circuit 18 generates essentially constant width gating signals of a duration equal to approximately 30 percent of the channel period for the pulse repetition velocity selected. The gating signals from the gate generator circuit 18, in addition to being applied to the information gating circuit 16 are also applied to a transfer and reset unit 28.

At the termination of each gating signal from the information gate generator circuit 18, the voltage level at the pulse integrator circuit 20 represents the integrated information signal. When the information gate is disabled, the integrated information signal is stored in the pulse integrator 20 for a short period of time while a reset pulse is generated in the transfer and reset unit 28.

The integrated information signals are applied from the pulse integrator circuit 20 to the driver unit 30 from which they are applied to respective channel gating circuits 32. The output signals from the driver unit 30 are illustrated at point W. The signals at point W represent the inverted and level compensated integrated information signals from the pulse integrator circuit 20. During the operation of the channel gating circuits 32, the output voltage from the driver unit 30 is applied to respective storage circuits 34. The stored voltages from the storage circuits 34 may be applied to respective output amplifiers 36, or to other suitable utilization circuits.

A reset pulse from a delay generator circuit 50, included in the transfer and reset unit 28 illustrated at point H, is applied to the pulse integrator circuit 20 during the interval between information pulses to reset the voltage level so that the pulse integrator circuit 20 is ready to accept the next information pulse. An output pulse at point F, which appears when a valid information pulse is received, is first applied to a transfer generator circuit 48 of the transfer and reset unit 28. The information gate pulse at point F produces pulses of approximately 50 microseconds duration in the transfer generator circuit 48. These pulses are applied to a transfer driver circuit 52 and, in conjunction with sequencing portions of the synchronization circuits not yet described, cause operation of the channel gating circuits 32 to permit transfer of the integrated information pulses (inverted and corrected) from the driver 30 to the appropriate storage devices 34.

Automatic calibration of the information data in accordance with refrence channels in the information wave train is accomplished by an information reference unit 40. The information reference unit 40 includes a sensitivity comparator circuit 42 and a zero comparator circuit 46. The output voltage from the zero comparator circuit 46 is the difference between a reference voltage and the output voltage which may be provided by one of the channels used for supplying zero information. When there is no zero drift in the system, the output voltage resulting from the channel used for the transmission of zero information is equal to the reference voltage. In this case, there is no difference in potential to be amplified by the zero comparator circuit 46 and the system remains quiescent. However, if there is a drift, the output voltage of the zero comparator circuit 46 appearing at point L (not illustrated in FIGURE 2) is utilized to adjust the reset potential of the pulse integrator circuit 20 to a reference value thereby compensating for system drifts.

The sensitivity comparator circuit 46 performs an operation similar to the zero comparator circuit. In pulse amplitude modulation systems, variations in sensitivity are compensated by adjusting the width of the gating pulses from the integrator control or information gate generator circuit 18 to thereby change the integration period of the pulse integrator circuit 20. The compensating voltage from the sensitivity comparator 42 is developed at point K (not illustrated in FIGURE 2) and is applied to the information gate generator circuit 18. An output voltage may be produced by signals from one of the incoming channels or from other suitable sources. A linearity correction unit, not illustrated, may be included in the system to correct input zero and sensitivity calibration signals for non-linearity before applying them to the sensitivity comparator circuit 42 or the zero comparator circuit 46. An example of an automatic compensation system utilized in telemetering systems is described in a copending patent application of I. Magasiny entitled "Automatic Compensation System," Patent No. 2,915,741 and assigned to the same assignee as the present invention.

In many of the systems used heretofore, a separate integrator circuit has been used for each commutated information channel. The use of a large number of integrator circuits have in the past greatly increased the weight, size and complexity of decommutation systems. The novel type of pulse integrator circuit, in combination with the other circuits illustrated, to be hereinafter described, has made the use of such a single integrator circuit possible in systems involving a large number of information channels.

Other portions of the system shown involve means for producing synchronizing and switching pulses to provide proper distribution of the integrated information signals so that each information pulse may be applied to its proper output channel for recording or for any other desired purpose. The output voltage at point E is applied to a switching unit 54. The switching unit 54 includes a switching pulse generator circuit 56 having output voltages at points M and N and a false pulse generator circuit 58 having an output voltage at point O. The switching unit 54 provides pulses to a sequence counter unit 60 and to a master pulse unit 62. When a switching pulse is missing from the information train, the false switching pulse generator circuit 58 provides the missing pulses to insure proper sequencing of the channel separation operation. A system involving circuits for supplying missing switching pulses is described in a patent "Multiplex Telemetering System" of F. N. Reynolds et al. 2,592,737, issued April 15, 1952, and assigned to the same assignee as the present invention.

The output voltage at point R from the master pulse generator is applied to a sequencing unit 64. The sequencing unit 64 may be a beam switching tube such as, for example, that described in a patent issued to S. Kuchinsy et al. 2,797,357 on June 25, 1957. During operation, output voltages at points S and T are applied from the sequence counter unit 60 to the sequencing unit 64. Since, for reliable operation, it is desirable to operate a beam switching tube separately on odd and even numbered pulses, the sequence counter unit 60 is provided. The unit 60 may be composed of binary counters with odd and even output buffer stages. It is noted that an output voltage from the master pulse unit 62 is also applied to the sequence counter unit 60 to reset it to the proper state when a master pulse or frame synchronizing pulse is received.

The output voltage from the sequencing unit 64 is applied to a plurality of channel gating circuits 32. When pulses from the transfer driver circuit 52 to control the time of operation and from the synchronizing unit 64 for selection of the proper gating circuit are simultaneously applied to the channel gating circuits 32, integrated information signals from the driver circuit 30 passes through the selected channel gating circuits 32 to respective storage circuits 34. The output voltages from the storage circuits 34 may be applied to output amplifiers 36 from which they may be applied to suitable recording devices, etc.

Let us now consider the operation of the system shown when it is adapted to receive and decommutate PWM signals. An important feature of the present invention is that it is readily adaptable for both PAM and PWM systems.

When the arm of the switch 11 is in the down, the system is adapted to decommutate PWM information signals. In this case, referring particularly to FIGURES 1 and 3, the output voltage at point A from the differential amplifier 10 is applied to the synchronization clipper 22. The output voltage at point B from the synchronization clipper 22 is then applied to the synchronization delay circuit 24. The output voltage at point C is used to trigger the synchronization generator 26. Noise pulses are eliminated in substantially the same manner as that mentioned in connection with PAM systems.

The output voltage from the synchronization generator 26 at point D, free of noise pulses, varies in width in accordance with the information signal and is applied to the information gate generator 18, which, as previously mentioned may be regarded as an integrator control circuit. The output voltages at point F from the information gate generator 18 are applied to open the information gate circuit 16. The gating signals are also applied to operate transfer generator 48.

During the duration of the information pulses, the pulse integrator 20 integrates in accordance with the width of the signals. The basic operation of the remaining portion of the system for PWM operation is substantially the same as for the PAM operation described. The use of substantially the same circuitry for both PAM and PWM systems greatly facilitates the design of many telemetering systems.

The invention involved in this application is primarily directed to the integrator 20 and the use of a single integrator circuit in systems involving the decommutation of a large number of information channels. Other features of the invention are directed to the circuits associated with the integrator 20 which makes possible the use of the single integrator circuit. Since this is so, a simplified block diagram illustrating the major features of the invention is shown.

Figure 4:
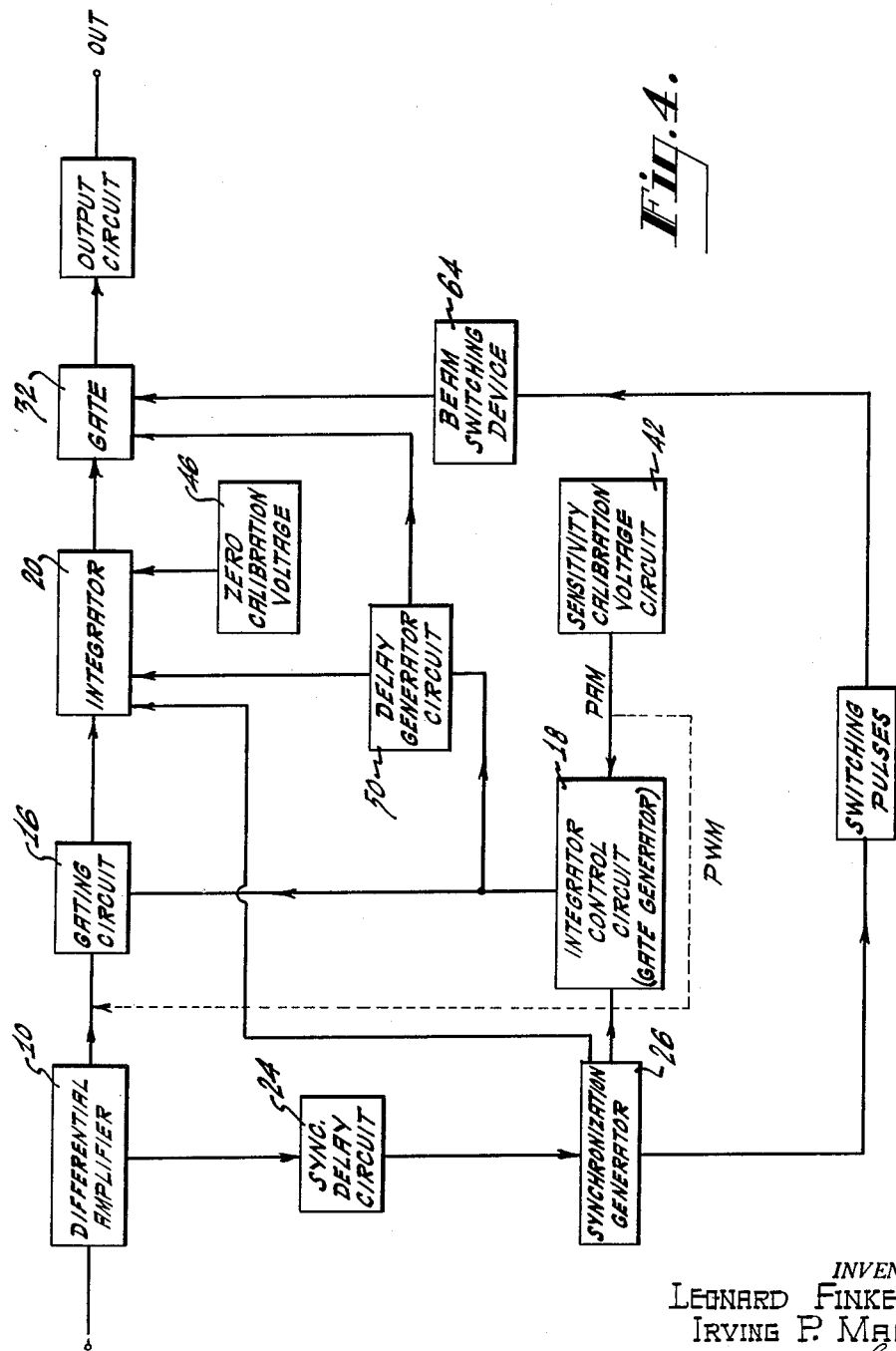
FIGURE 4 is a more simplified block diagram of the decommutation system involved in the present invention.
Figure 5:
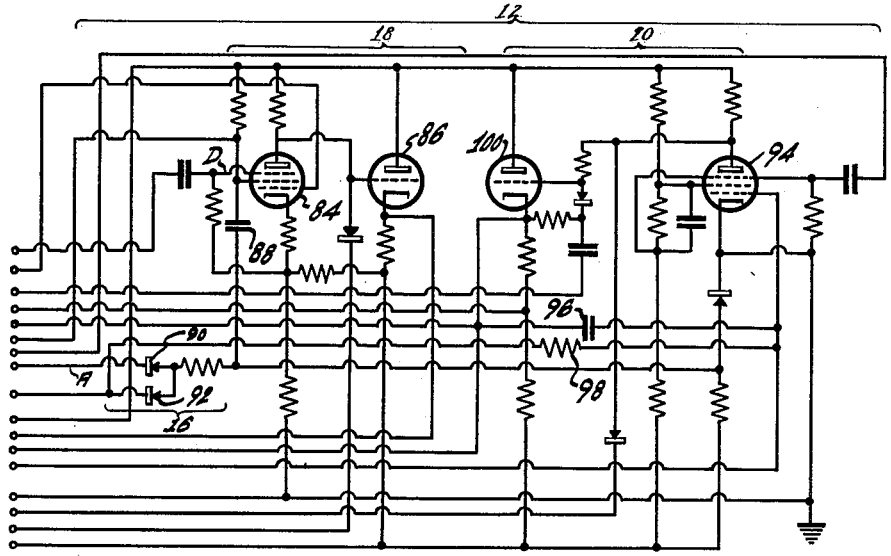
FIGURE 5 is a schematic diagram of an information control circuit which may be used in the present invention.
Figure 6:
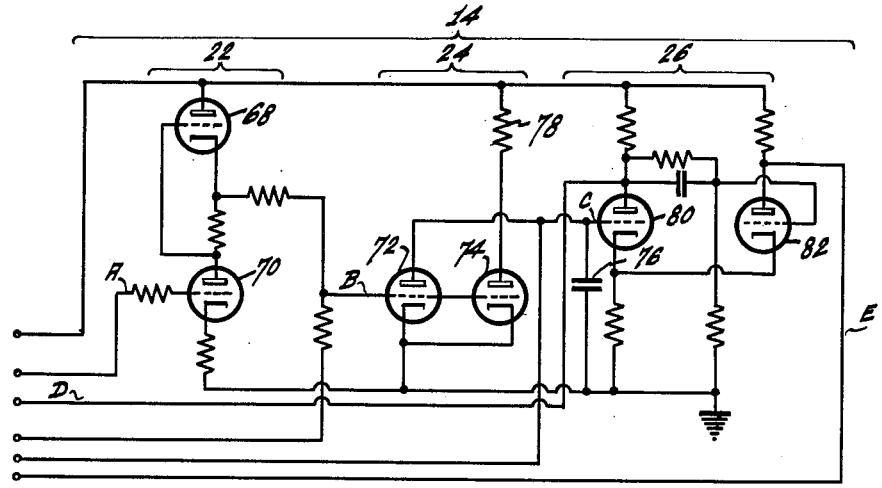
FIGURE 6 is a schematic diagram of a synchronization separator circuit which may be utilized in the present invention.
Figure 7:
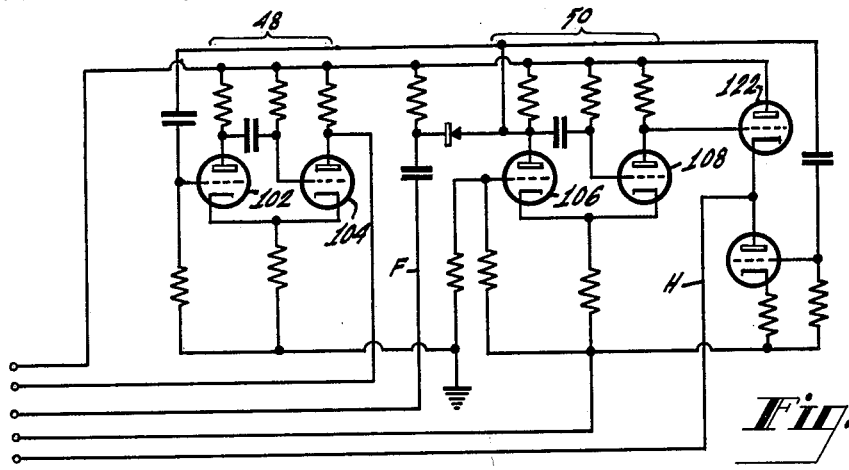
FIGURE 7 is a schematic diagram of a transfer circuit which may be utilized in the present invention.
Figure 8:
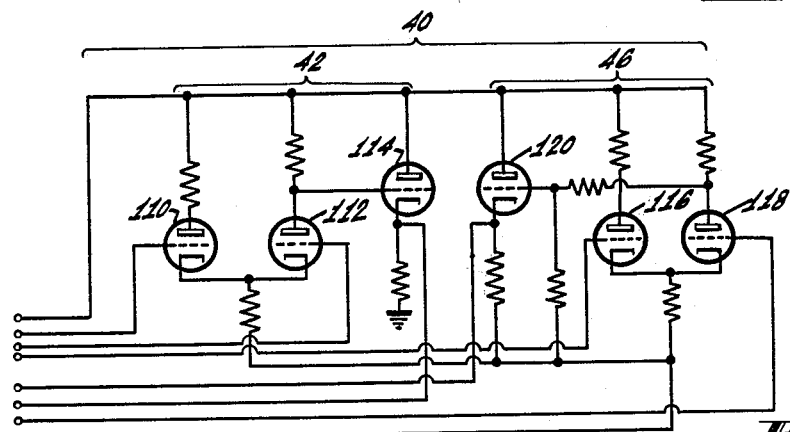
FIGURE 8 is a schematic diagram of an information reference circuit which may be utilized in the present invention.
Figure 9:
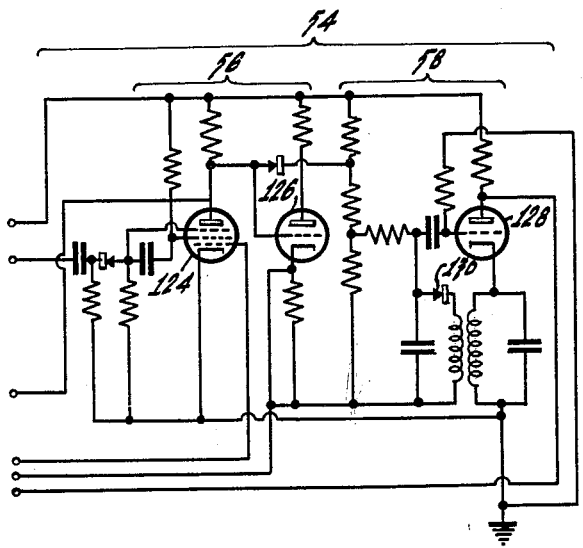
FIGURE 9 is a schematic diagram of a switching circuit which may be utilized in the present invention.
Figure 10:
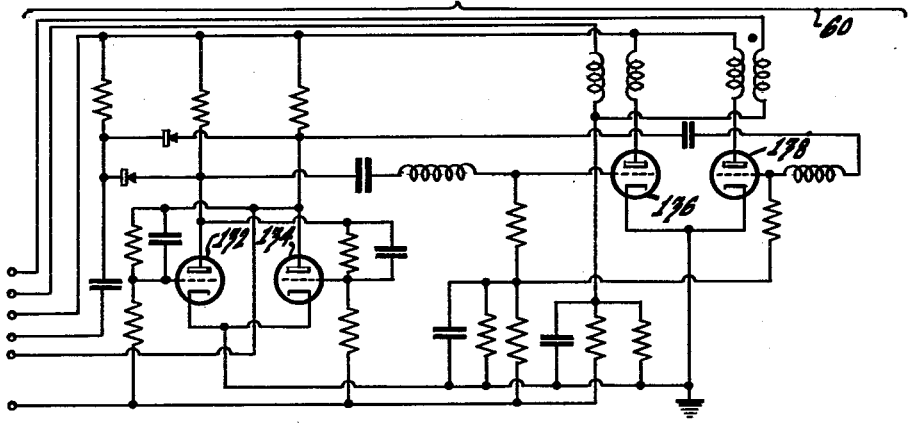
FIGURE 10 is a schematic diagram of a counter circuit which may be utilized in the present invention; and, FIGURE 11 is a master pulse switching circuit which may be utilized in the present invention.

Referring particularly to FIGURE 4, information signals are applied from the differential amplifier 10 through the information gating circuit 16 to the pulse integrator circuit 20. The integrated information signals are applied to an output circuit through a channel gating circuit 32. The output circuit may be a storage device, an amplifier or other suitable circuit. When the information gating circuit 16 is closed by the application of appropriate gate signals thereto, information signals are applied to the pulse integrator circuit 20. The information gating circuit 16 receives signals from the information gate generator or integrator control circuit 18. Gate signals from the information gate generator 18 will be produced only when valid information signals are received and is non-responsive to noise impulses.

The elimination of noise impulses is achieved by delaying the operation of the information gating circuit 16 by means of the synchronization delay circuit 24. When valid information signals are received, the delayed synchronization signals from the synchronization generator circuit 26 cause gate or control signals to be produced in the information generator circuit 18. The delayed gate signals close the information gating circuit 16 thereby permitting information signals to be applied to the pulse integrator circuit 20.

The integrated information signals from the pulse integrator circuit 20 are applied to an output circuit when the channel gating circuit 32 is operative. After a predetermined time interval, a reset pulse from the delay generator circuit 50 resets the pulse integrator circuit 20 between information pulses.

The channel gating circuit 32 will be operative or closed when simultaneous pulses are received from the delay generator circuit 50 and the beam switching device 64. The switching pulses to operate the beam switching device 64 are controlled by pulses from the synchronization generator circuit 26. The switching of the channel gating circuit 32 provides distribution of the information pulses to the proper output channels for recording, etc. Means for providing the switching pulses are illustrated by a single block and may include the switching unit 54, the sequence counter unit 60 and the master pulse unit 62, illustrated in FIGURE 1.

The zero comparator circuit 46 resets the pulse integrator circuit 20 to a reference potential at periodic intervals, as for example, at the end of each frame of the information wavetrain. The sensitivity comparator circuit 42 adjusts the information gate generator circuit 18 at periodic intervals in PAM systems. The same circuit 42 adjusts the information gating circuit 16 at periodic intervals in PWM systems.

Referring particularly to FIGURES 1, 2, 3 and 5, the information control unit 12 includes the information gate generator circuit 18 having vacuum tubes 84 and 86, associated with a phantastron circuit. Such phantastron circuits associated with Miller sweep circuits have been described generaly in the literature including "Pulse and Digital Circuits," by Millman and Taub, printed by McGraw-Hill Book Company, Inc., copyrighted 1956 on pages 217–228. The screen grid of the vacuum tube 84 is normally conducting. The suppressor grid of the tube is normally biased to cutoff and no conduction takes place in the anode circuit. Upon the application of a positive signal to the suppressor grid at point D, indicating that a valid information pulse has been received, conduction takes place in the anode circuit. A regenerative action takes place with the anode conducting and the screen grid becoming cutoff. A vacuum tube 86 having its control grid connected to the plate of the vacuum tube 84 aids in the regenerative action. A gating pulse is developed at the screen grid of the vacuum tube 84 and is applied through a capacitor 88 to the information gating circuit 16.

The information gating circuit 16 includes a pair of diodes 90 and 92. Information signals at point A are also applied to the information gating circuit 16. When a gate signal appears at the screen grid of the vacuum tube 84, the information signal at point A is permitted to pass through the gate to the pulse integrator circuit 20. The integrator circuit 20 comprises a capacitor 96, a resistor 98 as well as vacuum tubes 94 and 100 with its associated circuitry. The voltage developed between the capacitor 96 and the resistor 98 is applied to the control grid of the vacuum tube 94.

The output voltage from the tube 94 is applied to the vacuum tube 100. The output voltage from the cathode of the vacuum tube 100 corresponds to the information signals and may be considered as integrated information signals. A reset pulse is applied to the anode vacuum tube 94 after a short delay to permit the integrator circuit 20 to be reset and ready to accept the next information pulse. The basic operation of integrator circuit 20 is related to the Miller sweep and phantastron circuit as described in the literature indicated.

Referring to FIGURES 1, 2, 3 and 6, the circuit details of the synchronization separator unit 14 are shown. The output voltage from the differential amplifier 10, at point A, is applied to the synchronization clipper circuit 22 which includes a D.C. (direct current) amplifier comprising vacuum tubes 68 and 70. The D.C. amplifier has the characteristic of going from cutoff to saturation with the application thereto of relatively small signals. If a relatively small information signal is applied to the D.C. amplifier, saturation is quickly reached. If a small information signal below ground is applied to the D.C. amplifier, a cutoff condition is quickly reached. Thus, the D.C. amplifier comprising the vacuum tubes 68 and 70 may be considered as a clipping circuit having an output voltage such as illustrated at point B.

The output voltage from the D.C. amplifier at point B is applied to the synchronization delay circuit 24 comprising a pair of vacuum tubes 72 and 74 connected in parallel. The vacuum tubes 72 and 74 are normally conducting. Upon the application of the signal voltage at point B, the tubes 72 and 74 become cutoff and a capacitor 76 in the anode circuit starts to charge. The rate of charge is dependent upon the value of the capacitor 76 and the value of a resistor 78. The capacitor 76 may have another variable capacitor (not shown) connected parallel thereto to provide variable time constants. Or similarly, the resistor 78, may be made variable, or the voltage to which the resistor is returned may be varied.

The output voltage from the synchronization delay circuit 24 at point C is applied to the synchronization generator circuit 26 which comprises a pair of vacuum tubes 80 and 82. The synchronization generator comprises a comparator circuit which may be of the Schmidt type, as shown, having a square wave output voltage when a voltage of a predetermined value is applied thereto at point C. The voltage developed at point C across the capacitor 76 may be considered as a sawtooth wave. If a relatively short pulse is applied to the synchronization delay circuit 26, the capacitor 76 will charge for a relatively short time. The vacuum tubes 72 and 74 are biased so that the charge developed across the capacitor 76 is not sufficiently great to activate the comparator circuit when short pulses, such as those resulting from noise, are applied thereto. Consequently, only information pulses, since they are of sufficient width to permit the capacitor 76 to charge beyond a predetermined level, will trigger the comparator circuit. The output voltage from the synchronization generator circuit 26 at point D is applied to the information gate generator circuit 18 as well as to the master pulse unit 62. The output voltage from the synchronization generator circuit 26, at point E, is applied to the pulse integrator circuit 20.

Referring particularly to FIGURES 1, 2, 3 and 7, the transfer generator circuit 48 receives an information gate signal from the information gate generator circuit 18. The transfer generator circuit 48 comprises a pair of vacuum tubes 102 and 104. The trailing edge of the information gate signal, appearing at point F, triggers a one shot multivibrator circuit which includes the vacuum tubes 102 and 104. The output voltage from the multivibrator circuit, which may be of pulses approximately 50 microseconds in duration, are utilized to trigger the delay generator circuit 50 which includes a second one shot multivibrator circuit comprising vacuum tubes 106 and 108. The delay generator circuit 50 generates the pulse necessary to reset the integrator 20 between information pulses. The delay in the generation of the reset pulse is desirable to permit enough time for the information pulse signals to pass through the system. The output voltage from the delay generator circuit 50 is applied to an amplifier comprising a vacuum tube 122. It is the trailing edge of the pulse from the delay generator circuit 50, at point H, which is utilized to reset the pulse integrator 20 to receive subsequent information pulses.

Referring particularly to FIGURES 1, 2, 3 and 8, the information reference unit 40 comprises a sensitivity comparator circuit 42 and the zero comparator circuit 46. The sensitivity comparator circuit 42 includes a differential amplifier which include vacuum tubes 110 and 112. A source of reference potential is applied to the vacuum tube 110 with the calibration reference signal from one of the incoming channels being applied to the vacuum tube 112. The output voltage from the differential amplifier representing the voltage difference between the reference voltage and the incoming calibration voltage is applied to a vacuum tube 114. The output voltage from the vacuum tube 114 is supplied from its cathode to the information gate generator circuit 18 for PAM systems and to the information gate circuit 16 for PWM systems to provide sensitivity compensation for the systems.

The zero comparator circuit 46 comprises a second differential amplifier including vacuum tubes 116 and 118. A reference voltage is applied to the vacuum tube 116 and a zero calibration voltage is applied to the vacuum tube 118. The output voltage from the differential amplifier, representing the voltage difference between the zero reference voltage and the zero calibration voltage is applied to vacuum tube 120. The output voltage from the cathode of the vacuum tube 120 is applied to the pulse integrator circuit 20 to adjust the starting level of the integrating period thereby providing zero calibration to compensate for system drifts, etc.

If desired, various linearity correction circuits may be employed prior to the application of the calibration signals to the sensitivity comparator circuit 42 or the zero comparator circuit 46.

Referring particularly to FIGURES 1, 2, 3 and 9, the output voltage at point E is applied to the switching unit 54 which comprises the switching pulse generator circuit 56 and the pulse generator circuit 58. The output pulse at point E is developed only when a proper information signal has been received. The switching pulse generator circuit 56 includes a phantastron circuit comprising vacuum tubes 124 and 126. The switching pulses at point E are utilized to reset the phantastron circuit. In the event that no pulse is applied to reset the phantastron circuit, as when an information pulse is missing from the signal train, a false pulse generator circuit 58 is actuated. The false pulse generator 58 comprises a comparator circuit, which may be a multiar circuit, as shown, including a vacuum tube 128 associated with a blocking oscillator. The blocking oscillator operates only when a sweep voltage from the phantastron circuit exceeds a predetermined voltage level. This voltage level is determined primarily by the bias across a diode device 130 associated with the control grid of the vacuum tube 128. When the comparator circuit operates, a pulse is applied to reset the phantastron circuit. The false switching pulse from the false pulse generator circuit 58 is also applied to the master pulse unit 62.

Referring particularly to FIGURES 1, 2, 3 and 10, the output voltage from the switching pulse generator 56 is applied to the sequence counter unit 60. The purpose of the sequence counter unit 60 is to provide pulses of the proper sequence to drive the sequencing unit 64, which may be a beam switching tube. A pair of vacuum tubes 132 and 134 comprises a binary flip-flop counter circuit. When switching pulses, including those formed by the information pulses, as well as those formed by the false pulse generator circuit 58, are applied to the vacuum tubes 132 and 134, pulses relating to odd numbers are developed across the anode of the vacuum tube 132 and pulses relating to even numbers are developed across the anode of the vacuum tube 134. The output pulses from the binary flip-flop circuit are applied to blocking oscillators including vacuum tubes 136 and 138 to obtain suitable pulses to drive the beam switching tube. Cathode follower circuits may also be used in place of the blocking oscillator or the sequencing unit may be driven directly from the counter if desired. At the start of each information train, the binary flip-flop circuit comprising the vacuum tubes 132 and 134 is reset to the wrong operating condition, i.e., in the even state for an odd pulse. The first information pulse, therefore, does not operate the binary flip-flop circuit thereby permitting the first information pulse to be applied to the number one element of the beam switching tube.

Figure 11:
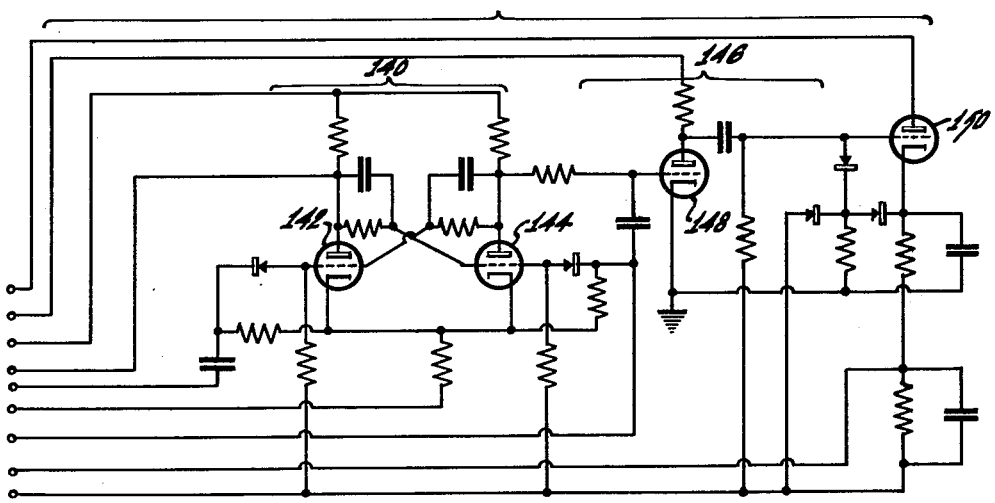

Referring particularly to FIGURE 11, the false switching pulses as well as synchronization pulses are applied to the master pulse unit 62. This unit includes a flip-flop multivibrator circuit 140 comprising vacuum tubes 142 and 144. The input grid of vacuum tube 142 is adapted to respond to normal switching pulses only and not to false switching pulses. The input grid of vacuum tube 144 is adapted to respond only to false switching pulses. The flip-flop circuit 140 may be considered as a memory device with respect to information relating to the last pulse. That is, it is capable of determining whether the last received pulse was a regular switching pulse or a false switching pulse. The output voltage from the flip-flop circuit 140 is applied to a coincidence circuit 146 comprising a vacuum tube 148. A coincidence circuit 146 is designed to generate an output pulse only when two false switching pulses are applied thereto. This will be the case when a previous pulse was a false switching pulse, as determined by the operating state of the vacuum tube 144, and presently received pulse is also a false switching pulse. A second coincidence circuit comprises a vacuum tube 150. This coincidence circuit will operate only when a pulse from the previous coincidence circuit 146 is applied thereto and when the last channel of the information train has fired. Indications that the last channel has fired will be reflected by the cathode voltage of the beam switching tube which may be connected to the second coincidence circuit. The output voltage at point R corresponds to a master pulse and is used to reset the sequence counter unit 60 which in turn resets the beam switchinng tube included in the sequencing unit 64 to its number one position.

While a complete decommutation system has been illustrated in detail, this patent application is primarily directed to a decommutation system involving the information control unit 12 and circuits associated therewith.

While PAM and PWM systems have been emphasized, slight modifications of the circuitry shown may be made without departing from the scope of the invention to provide decommutation for other systems utilizing time intervals or amplitude for varying information signals.

What is claimed is:

1. A decommutation system comprising a source of information pulses, a single integrator circuit, a gating circuit, a gate generator for producing gate signals to render said gating circuit operative, a synchronization circuit to provide synchronization pulses to operate said gate generator, means for applying said information pulses to said synchronization circuit to produce said synchronization pulses, means for applying a plurality of said information pulses to said single integrator circuit during the gating period of said gating signals to provide integrated information pulses, a utilization circuit, means for applying said integrated information pulses from said integrated circuit to said utilization circuit, means for resetting said integrator circuit in the interval between information pulses, means for applying a zero reference level potential to said integrator circuit, and means for producing a sensitivity reference level potential to adjust said integrator circuit.

2. A decommutation system comprising a source of information pulses, a single integrator circuit, a gating circuit, a gate generator for producing gate signals to render said gating circuit operative, a synchronization circuit to provide synchronization pulses to operate said gate generator, means for applying said information pulses to said synchronization circuit to produce said synchronization pulses, means for applying a plurality of said information pulses to said single integrator circuit during the gating period of said gating signals to provide integrated information pulses, a utilization circuit, means for applying said integrated information pulses from said integrated circuit to said utilization circuit, means for resetting said integrator circuit in the interval between information pulses, means for applying a zero reference level potential to said integrator circuit, means for producing a sensitivity reference level potential to adjust said integrator circuit, and means for delaying the generation of said synchronization pulses.

3. A decommutation system as set forth in claim 2 wherein a clipper circuit is interposed between said source of information pulses and said synchronization circuit.

4. A decommutation system as set forth in claim 3 wherein said synchronization pulses are applied to said integrator circuit to start integration of said information pulses.

5. A decommutation system as set forth in claim 4 wherein means are provided to delay the resetting of said integrator circuit.

6. A decommutation system comprising a source of variable amplitude information pulse signals, an integrator circuit, a gating circuit, a gate generator for producing relatively constant width gate signals to render said gating circuit operative, means for applying said information signals to said integrator circuit through said gating circuit to produce integrated information signals, a zero compensation circuit for comparing a first calibration signal with a zero reference voltage to provide a zero calibration voltage, means for applying said zero calibration voltage to said integrator circuit, a sensitivity compensation circuit for comparing a second calibration signal with a predetermined sensitivity voltage to provide a sensitivity calibration voltage, means for applying said sensitivity calibration voltage to said gate generator, a utilization circuit, means for applying said integrated informaton signals from said integrator circuit to said utlization circuit, means for resetting said integrator circuit between information pulse signals, and means for delaying the generation of said gate signals in said gate generator.

7. A decommutation system comprising a differential amplifier, a source of variable amplitude information pulse signals, means for applying said information signals to said amplifier, an integrator circuit, a gating circuit, a gate generator for producing relatively constant width gate signals to render said gating circuit operative, a synchronization circuit for producing synchronizing pulses, means for applying said synchronizing pulses to operate said gate generator, means for applying said information signals to said integrator circuit for said amplifier through said gating circuit when said gating circuit is operative whereby information signals of relatively constant width and variable amplitudes are applied to said integrator circuit to produce integrated information signals, a zero compensation circuit for comparing a first calibration signal with a zero reference voltage to provide a zero calibration voltage, means for applying said zero calibration voltage to said integrator circuit to provide a reference level for said integrator circuit, a sensitivity compensation circuit for comparing a second calibration signal with a predetermined sensitivity voltage to provide a sensitivity calibration voltage, means for applying said sensitivity calibration voltage to said gate generator to adjust the width of said generated gate signals, a utilization circuit, means for applying said integrated infomation signals from said integrator circuit to said utilization circuit, means for resetting said integrator circuit between said information pulse signals, and means for delaying the generation of said gate signal in said gate generator.

8. A decommutation system as set forth in claim 7 wherein said synchronization pulses from said synchronization circuit are applied to said integrator circuit to start integration of said information pulses.

9. A decommutation system as set forth in claim 8 wherein means are provided to delay the resetting of said integrator circuit.

10. A decommutation system as set forth in claim 9 wherein a channel gating circuit is operative by a beam switching device.

11. A decommutation system as set forth in claim 10 wherein the integrated information pulses are applied to an output circuit through said channel gating circuit when switching pulses render said beam switching device operative.

12. A decommutation system as set forth in claim 11 wherein synchronization pulses from said synchronization circuit are utilized to produce said switching pulses to render said beam switching device operative.

13. A decommutation system comprising a differential amplifier, a source of variable width information pulse signals, means for applying said information signals to said amplifier, an integrator circuit, a gating circuit, a gate generator to render said gating circuit operative, a synchronization circuit, means for applying said variable width information signals from said amplifier to said synchronization circuit to produce synchronization pulses in said synchronization circuit, means for applying the output signal from said synchronization circuit to said gate generator to produce gate signals corresponding in width to said information signals, means for applying said gate signals to said integrator circuit through said gating circuit to provide integrated information signals, a zero compensation circuit for comparing a first calibration signal with a zero reference voltage to provide a zero calibration voltage, means for applying said zero calibration voltage to said integrator circuit to provide a reference level for said integrator circuit, a sensitivity compensation circuit for comparing a second calibration signal with a predetermined sensitivity voltage to provide a sensitivity calibration voltage, means for applying said sensitivity calibration voltage to said gating circuit to adjust the amplitude of the gating signals applied to said integrator circuit, a utilization circuit, means for applying said integrated information signals from said integrator circuit to said utilization circuit, means for resetting said integrator circuit between said information pulses, and means for delaying the generation of said gate signals in said gate generator.

14. A decommutation system as set forth in claim 13 wherein said synchronization pulses from said synchronization circuit are applied to said integrator circuit to start integration of said information pulses.

15. A decommutation system as set forth in claim 14 wherein means are provided to delay the resetting of said integrator circuit.

16. A decommutation system as set forth in claim 15 wherein a channel gating circuit is operative by a beam switching device.

17. A decommutation system as set forth in claim 16 wherein the integrated information pulses are applied to an output circuit through said channel gating circuit when switching pulses render said beam switching device operative.

18. A decommutation system as set forth in claim 17 wherein synchronization pulses from said synchronization circuit are utilized to produce said switching pulses to render said beam switching device operative.

19. A decommutation system comprising a source of information pulses, an integrator circuit, a gating circuit, a gate generator for producing gate signals to render said gating circuit operative, a synchronization circuit to provide synchronization pulses to operate said gate generator, a clipper circuit, means for applying said information pulses to said clipper circuit, means for applying output pulses from said clipper circuit to said synchronization circuit to produce said synchronization pulses said gating circuit being operative by a beam switching tube to produce gating signals, means for applying said information pulses to said integrator circuit during the gating period of said gating signals to provide integrated information pulses, means for applying said synchronization pulses to said integrator circuit to start integration of said information pulses, a utilization circuit, means for applying said integrated information pulses from said integrator circuit to said utilization circuit, means for resetting said integrator circuit in the interval between information pulses, means for delaying the resetting of said integration circuit, means for applying a zero reference level potential to said integrator circuit, means for producing a sensitivity reference level potential to adjust said integrator circuit, and means for delaying the generation of said synchronization pulses.

20. A decommutation system as set forth in claim 19 wherein the integrated information pulses are applied to an output circuit through said channel gating circuit when switching pulses render said beam switching device operative.

21. A decommutation system as set forth in claim 20 wherein switching pulses are applied to said beam switching tube.

22. A decommutation system as set forth in claim 21 wherein synchronization pulses from said synchronization circuit are utilized to produce said switching pulses.

References Cited in the file of this patent

UNITED STATES PATENTS

| | | |
|---|---|---|
| 2,600,193 | Bell et al. | June 10, 1952 |
| 2,673,929 | Huffman | Mar. 30, 1954 |
| 2,739,298 | Lovell | Mar. 20, 1956 |
| 2,885,662 | Hansen | May 5, 1959 |
| 2,918,574 | Gimpel | Dec. 22, 1959 |